United States Patent Office 2,988,566
Patented June 13, 1961

2,988,566
O-HALOARYL O-FLUOROALKYL PHOSPHOROAMIDOTHIOATES
Fred W. Raths, Memphis, Tenn., assignor to The Dow Chemical Company, Midland, Mich., a corporation of Delaware
No Drawing. Filed Dec. 18, 1959, Ser. No. 860,309
5 Claims. (Cl. 260—461)

The present invention is directed to O-haloaryl O-fluoroalkyl phosphoroamidothioates corresponding to the formula

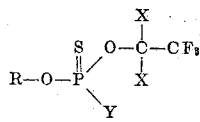

In this and succeeding formulae, R represents a haloaryl radical, each X represents hydrogen or methyl, and Y represents lower alkyl amino. The expression lower alkyl is employed in the present specification and claims to refer to radicals containing from 1 to 5 carbon atoms, inclusive. These new compounds are liquid or crystalline solid materials which are somewhat soluble in many organic solvents and of low solubility in water. They are useful as parasiticides and are adapted to be employed as active toxic constituents of compositions for the control of mite, insect, ascaris and bacterial organisms such as flies, beetles and southern army worms.

The new compounds may be prepared by reacting an alkali metal salt of 2,2,2-trifluoroethanol, 1,1,1-trifluoro-2-propanol, or 1,1,1-trifluoro-2-methyl-2-propanol with an O-aryl phosphoroamidochloridothioate corresponding with the formula

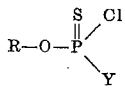

The reaction preferably is carried out in an inert organic liquid as reaction medium and conveniently in the alcohol from which the alcoholate is prepared. Good results are obtained when employing substantially equimolecular proportions of the reagents. The reaction is somewhat exothermic and takes place smoothly at temperatures of from −10° to 80° C. with the production of the desired product and alkali metal chloride of reaction. The temperature may be controlled by regulating the rate of contacting the reactants and by external cooling. In carrying out the reaction the reactants may be mixed together in any convenient fashion and at a temperature of from −10° to 80° C. When the reaction is complete, any reaction medium may be removed by evaporation or fractional distillation under reduced pressure and the reaction product dissolved in a water immiscible solvent such as benzene. The solvent solution is washed with water and the solvent removed by evaporation or distillation under reduced pressure to obtain the desired product as a residue. This product may be further purified by conventional procedures.

The following examples merely illustrate the invention and are not to be construed as limiting:

*Example 1—O-(2,4-dichlorophenyl) O-(2,2,2-trifluoroethyl) N-methyl phosphoroamidothioate*

2,2,2-trifluoroethanol (20 grams; 0.2 mole) was added to 9.2 grams (0.2 mole) of sodium dispersed in 500 milliliters of benzene to produce a solution of sodium 2,2,2-trifluoroethylate. The addition was carried out with stirring at room temperature and the mixture thereafter heated at 35° C. for two hours to complete the reaction. O-(2,4-dichlorophenyl) N-methyl phosphoroamidochloridothioate (132.4 grams; 0.3 mole) was added portionwise to the above mixture over a period of 15 minutes. The addition was carried out with stirring and at a temperature of from 20° to 25° C. Stirring was thereafter continued for two hours and the mixture thereafter set aside for 16 hours. The reaction mixture was then filtered and the reaction medium removed by evaporation under reduced pressure to obtain an O-(2,4-dichlorophenyl) O-(2,2,2-trifluoroethyl) N-methyl phosphoroamidothioate product as a liquid residue. This product had a refractive index n/D of 1.5260 at 25° C. and a sulfur content of 9.0 percent as compared to a theoretical content of 9.04 percent.

*Example 2—O-(2,4-dichlorophenyl) O-(1,1,1-trifluoro-2-propyl) N-methyl phosphoroamidothioate*

1,1,1-trifluoro-2-propanol (22.8 grams; 0.2 mole) was added portionwise to 0.2 mole of sodium dispersed in 500 milliliters of benzene to prepare a solution of the sodium salt of 1,1,1-trifluoro-2-propanol. The addition was carried out over a period of 30 minutes at 15° to 20° C. and stirring thereafter continued for one hour. O-(2,4-dichlorophenyl) N-methyl phosphoroamidochloridothioate (43.6 grams; 0.15 mole) was added portionwise to the above mixture over a period of one-half hour with stirring and at a temperature of from 20° to 25° C. Stirring was thereafter continued for two hours at room temperature to complete the reaction. The reaction mixture was then washed with water, the washed product dried over calcium chloride and the reaction medium removed from the dried product by distillation under reduced pressure. The residue was extracted with carbon disulfide and the carbon disulfide removed from the extract by distillation under reduced pressure to obtain an O-(2,4-dichlorophenyl) O-(1,1,1-trifluoro-2-propyl) N-methyl phosphoroamidothioate product as a liquid residue. This product had a refractive index n/D of 1.5637 at 25° C.

*Example 3—O-(2,4-dichlorophenyl) O-(1,1,1-trifluoro-2-methyl-2-propyl) N-methyl phosphoroamidothioate*

1,1,1-trifluoro-2-methyl-2-propanol (25.6 grams; 0.2 mole) was added portionwise over a period of 30 minutes and at a temperature of from 15° to 20° C. to 0.2 mole of sodium dispersed in 500 milliliters of benzene. Stirring was thereafter continued for 30 minutes at room temperature. O-(2,4-dichlorophenyl) N-methyl phosphoroamidochloridothioate (43.6 grams; 0.15 mole) was added portionwise to the above solution of the sodium alcoholate. The addition was carried out with stirring over a period of 30 minutes and at a temperature of from 20°–25° C. Stirring was thereafter continued for two hours at room temperature to complete the reaction. The reaction mixture was then washed with water, the washed product dried over calcium chloride and the reaction medium removed from the dried product by distillation under reduced pressure. The residue was extracted with carbon disulfide and the carbon disulfide removed from the extract by fractional distillation under reduced pressure at temperatures up to 50° C. at one millimeter pressure. As a result of these operations, there was obtained an O-(2,4-dichlorophenyl) O-(1,1,1-trifluoro-2-methyl-2-propyl) N-methyl phosphoroamidothioate product as a liquid material having a refractive index n/D of 1.5728 at 25° C.

*Example 4—O-(2,4,5-trichlorophenyl) O-(2,2,2-trifluoroethyl) N-ethyl phosphoroamidothioate*

2,2,2-trifluoroethanol (0.2 mole) was added portionwise over a period of 30 minutes at a temperature of from 15° to 20° C. to 0.2 mole of sodium dispersed in 500 milliliters of benzene. O-(2,4,5-trichlorophenyl) N- ethyl phosphoroamido-chloridothioate 0.19 mole was reacted with the above sodium trifluoroethylate solution to produce an O-(2,4,5-trichlorophenyl) O-(2,2,2-trifluoroethyl) N-ethyl phosphoroamidothioate product as a liquid material. The conditions of reaction and methods of separation were all as described in Example 3. O-(2,4,5-trichlorophenyl) O-(2,2,2-trifluoroethyl) N-ethyl phosphoroamidothioate has a molecular weight of 357.

In a similar manner, other O-haloaryl O-fluoroalkyl phosphoroamidothioates of the present invention may be prepared as follows:

O - (pentachlorophenyl) O-(2,2,2-trifluoroethyl) N-amyl phosphoroamidothioate by reacting potassium 2,2,2-trifluoroethylate with O-(pentachlorophenyl) N-amyl phosphoroamidochloridothioate.

O-(2,4,5-tribromophenyl) O-(2,2,2-trifluoroethyl) N,N-dimethyl phosphoroamidothioate by reacting potassium 2,2,2-trifluoroethylate with O-(2,4,5-tribromophenyl) N,N-dimethyl phosphoroamidochloridothioate.

O-(2-halo-4-lower alkylphenyl) O-(2,2,2-trifluoroethyl) N-lower alkyl phosphoroamidothioate by reacting sodium 2,2,2-trifluoroethylate with O-(2-halo-4-lower alkylphenyl) N-lower alkyl phosphoroamidochloridothioate.

O-(4-bromophenyl) O-(1,1,1-trifluoro-2-propyl) N,N-dibutyl phosphoroamidothioate by reacting the potassium salt of 1,1,1-trifluoro-2-propanol with O-(4-bromophenyl) N,N-dibutyl phosphoroamidochloridothioate.

O - (4 - bromo-2,4-dichlorophenyl) O-(2,2,2-trifluoroethyl) N-methyl phosphoroamidothioate by reacting sodium 2,2,2-trifluoroethylate with O-(4-bromo-2,4-dichlorophenyl) N-methyl phosphoroamidochloridothioate.

O-(3,4-dichlorophenyl) O-(1,1,1-trifluoro-2-methyl-2-propyl) N-propyl phosphoroamidothioate by reacting sodium salt of 1,1,1-trifluoro-2-methyl-2-propanol with O-(3,4-dichlorophenyl) N-propyl phosphoroamidochloridothioate.

O - (2,4,6-trichlorophenyl) O-(2,2,2-trifluoroethyl) N-methyl phosphoroamidothioate by reacting sodium 2,2,2-trifluoroethylate with O-(2,4,6-trichlorophenyl) N-methyl phosphoroamidochloridothioate.

O-(2-bromo-4-methylphenyl) O-2,2,2-trifluoroethyl N-methyl phosphoroamidothioate by reacting sodium 2,2,2-trifluoroethanol with O - (2-chloro-4-methylphenyl) N-methyl phosphoroamidochloridothioate.

O-(2-chloro-4-amylphenyl) O-(1,1,1-trifluoro-2-propyl) N-ethyl phosphoroamidothioate by reacting sodium 1,1,1-trifluoro-2-propanol with O-(2-chloro-4-amylphenyl) N-ethyl phosphoroamidochloridothioate.

The new compounds of the present invention are effective as parasiticides and are adapted to be employed for the control of many bacterial and insect organisms. For such use, the products may be dispersed on an inert finely divided solid and employed as dusts. Also, such mixtures may be dispersed in water with the aid of a surface active agent, and the resulting aqueous suspensions employed as sprays. In other procedures, the products may be employed as constituents of oil-in-water emulsions or water dispersions with or without the addition of surface active dispersing agents. In representative operations, 100 percent controls of flies are obtained with aqueous compositions containing 100 parts by weight of O-(2,4-dichlorophenyl) O-(2,2,2-trifluoroethyl) N-methyl phosphoroamidothioate per million parts by weight of ultimate composition.

The O-haloaryl phosphoroamidochloridothioates employed as starting materials in accordance with the teachings of the present application may be prepared by reacting two molecular proportions of a suitable amine with one molecular proportion of an O-haloaryl phosphorodichloridothioate at a temperature of from —10° to 30° C. Upon completion of the reaction, the desired phosphoroamidochloridothioate is separated by conventional methods. The O-haloaryl phosphorodichloridothioates may be prepared by reacting a molecular excess of phosphorus thiochloride with a suitable aryl alcohol in the presence of a tertiary amine as hydrogen chloride acceptor. Good results are obtained when operating at temperatures of from 40°–100° C. and employing from 4–10 moles of $PSCl_3$ with one mole each of tertiary amine and haloaryl alcohol.

I claim:

1. The phosphoroamidothioates corresponding to the formula

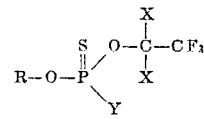

wherein R represents a member of the group consisting of halophenyl and 2-halo-4-lower alkylphenyl, Y represents lower alkyl amino and each X represents a member of the group consisting of hydrogen and methyl.

2. O-(2,4-dichlorophenyl) O-(2,2,2-trifluoroethyl) N-methyl phosphoroamidothioate.

3. O-(2,4-dichlorophenyl) O-(1,1,1-trifluoro-2-propyl) N-methyl phosphoroamidothioate.

4. O-(2,4-dichlorophenyl O-(1,1,1-trifluoro-2-methyl-2-propyl) N-methyl phosphoroamidothioate.

5. A method for the production of a phosphoroamidothioate corresponding to the formula

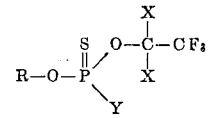

which comprises reacting a phosphoroamidochloridothioate having the formula

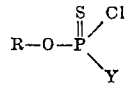

with an alkali metal salt of an alcohol having the formula

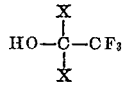

wherein in said formulae R represents a member of the group consisting of halophenyl and 2-halo-4-lower alkylphenyl, Y represents lower alkyl amino and each X represents a member of the group consisting of hydrogen and methyl.

No references cited.